May 3, 1927. 1,627,076
V. Z. CARACRISTI
VALVE CUT-OFF AND SPEED INDICATOR
Filed Jan. 12, 1925   4 Sheets-Sheet 2

INVENTOR
Virginius Z. Caracristi
BY
Pennie, Davis, Marvin & Edmonds
His ATTORNEYS May 3, 1927.  
V. Z. CARACRISTI  
1,627,076  
VALVE CUT-OFF AND SPEED INDICATOR  
Filed Jan. 12, 1925  
4 Sheets-Sheet 3

May 3, 1927.

V. Z. CARACRISTI 1,627,076

VALVE CUT-OFF AND SPEED INDICATOR

Filed Jan. 12, 1925　　4 Sheets-Sheet 4

Patented May 3, 1927.

1,627,076

UNITED STATES PATENT OFFICE.

VIRGINIUS Z. CARACRISTI, OF BRONXVILLE, NEW YORK.

VALVE CUT-OFF AND SPEED INDICATOR.

Application filed January 12, 1925. Serial No. 1,869.

This invention relates to the art of steam engine operation and has to do particularly with apparatus by which the cut-off of a steam engine may be controlled so as to produce maximum work throughout the range of speed of the engine. More specifically, the invention comprises apparatus for indicating the rate of rotation of the engine shaft, or, in the case of a locomotive, the surface speed, in appropriate units, and for similarly indicating in the same units, a result which is produced by the conversion of all the factors governing cut-off, including those values of cut-off which produce maximum work at different speeds, into a single expression.

In the operation of steam locomotives it is well known that in order to produce maximum work, the position of cut-off with reference to piston stroke must be varied in accordance with the speed of the piston. In the case of locomotives this piston speed is directly proportional to the speed of the locomotive, and an instrument indicating surface speed could be modified so as to give its indications in speed of piston travel. Such an instrument alone, however, would not be sufficient to indicate to the engineer the position of the cut-off to produce maximum draw-bar pull, because, even though knowing the different rates of piston speed, he would still have to bear in mind what cut-off would produce the greatest work at each different piston speed, and would have to adjust the cut-off valve accordingly. Since the adjustment of cut-off would, therefore, be left largely to the engineer's judgment, such an instrument would afford no considerable advantage over the speed indicating instruments now commonly in use. In order to make such a device of maximum utility, it is necessary to provide means by which the correct position of the cut-off valve is indicated to the engineer throughout the range of speed, and if this device is so arranged that the engineer may ascertain the correct position of the valve for each speed, the operation of the locomotive will be greatly simplified and because of the ease of control now afforded, the probabilities are that the engineer will operate the locomotive at its maximum efficiency.

Among the factors which have to be taken into account in the construction of such a device, are the values of the position of cut-off to produce maximum draw-bar pull throughout the range of speed, and these values may be ascertained by means of tests. Another point which must be considered is that equal increments of movement of the operating gear, and more specifically of the tumbling shaft, do not result in equal increments of cut-off due to differences in angularity of the moving parts of the valve motion. Such variations, however, are constant in all forms of valve operating mechanism used in locomotives, and this factor may, therefore, be accurately incorporated in the final result.

In locomotives the surface speed may be expressed in terms of piston speed, driving wheel diameter, and piston stroke, by a formula as follows:

$$\frac{v}{V} = 56\frac{s}{d},$$

in which V represents locomotive speed in terms of miles per hour, $v$ piston speed in feet per minute, $d$ driving wheel diameter in inches, and $s$ piston stroke in inches. Since driving wheel diameter and piston stroke are constants in any given locomotive, by ascertaining the surface speed at any instant the piston speed may readily be calculated.

Another factor which must be considered in the construction of an instrument for the purposes previously mentioned, is the fact that although the cut-off valve is adjusted throughout its range of movement by a tumbling shaft which travels through a distance of approximately 27° of arc, it is desirable to express this movement of the cut-off in terms of cam travel through 90° of arc. It is necessary consequently to convert the values of tumbling shaft travel into corresponding values of cam travel corrected to 90°, and a graphical representation of these values may readily be obtained by plotting variations secured as a result of tests.

It will be seen from the foregoing that in order to construct an instrument in which the values of cut-off to produce maximum draw-bar pull are expressed in terms of units of surface speed, such, for instance, as miles per hour, a number of constant and variable factors must be converted into a single expression in terms of units of surface speed, and included among these factors must be the results of tests indicating the position of cut-off to produce maximum draw-bar pull throughout the range of speeds. In my co-pending application, Ser. No. 738,708, filed September 19, 1924, I have described a method of producing a cam which acts to convert these factors into a single expression, and in the present device I have provided apparatus in which a conversion device including such a cam is interposed in operative connections between an indicating needle and the cut-off valve. As the valve is then given different positions of adjustment, its movement is transmitted to the needle through the conversion device, and the device acts to convert such movement of the valve so that at each position of rest of the latter, the needle will indicate the speed at which that position of the valve will produce maximum draw-bar pull. Accordingly when such a needle is associated with a second needle, suitably driven to indicate speed in miles per hour, since the two needles give indications expressed in the same units, it follows that when the valve is so positioned that the cut-off needle assumes a position corresponding to that of the speed needle, the valve is at that time properly adjusted to produce maximum draw-bar pull under the conditions of operation then existing.

While I have above described the operation of the present apparatus in general terms with reference to its use in a locomotive, it will be observed that it is equally useful in connection with stationary steam engines operating at varying speeds. In such an application, however, the values of cut-off will be expressed in units of speed of rotation of the drive shaft, and the needle which in a locomotive, would be suitably driven so as to indicate speed in miles per hour, will now indicate the rate of rotation of the drive shaft. In either instance the needle associated with the cut-off valve and moved to different positions in accordance with the adjustment of the latter, will provide an indication expressed in the same units as the needle driven by a moving part of the engine and indicating either the speed of rotation of the drive shaft or surface speed. Under these conditions the operation of the engine to produce maximum work is greatly simplified and the operator will only have to make sure that the two needles are in corresponding positions at all times in order to secure the maximum work. In the present apparatus I prefer to place the two needles in a single case, mounting them on the same shaft, and the needles are given a movement through an identical arc so that the adjustment of the valve is facilitated.

In the accompanying drawings there is shown one embodiment of the invention of the type to be used in locomotives, and in these drawings.

Figure 1:
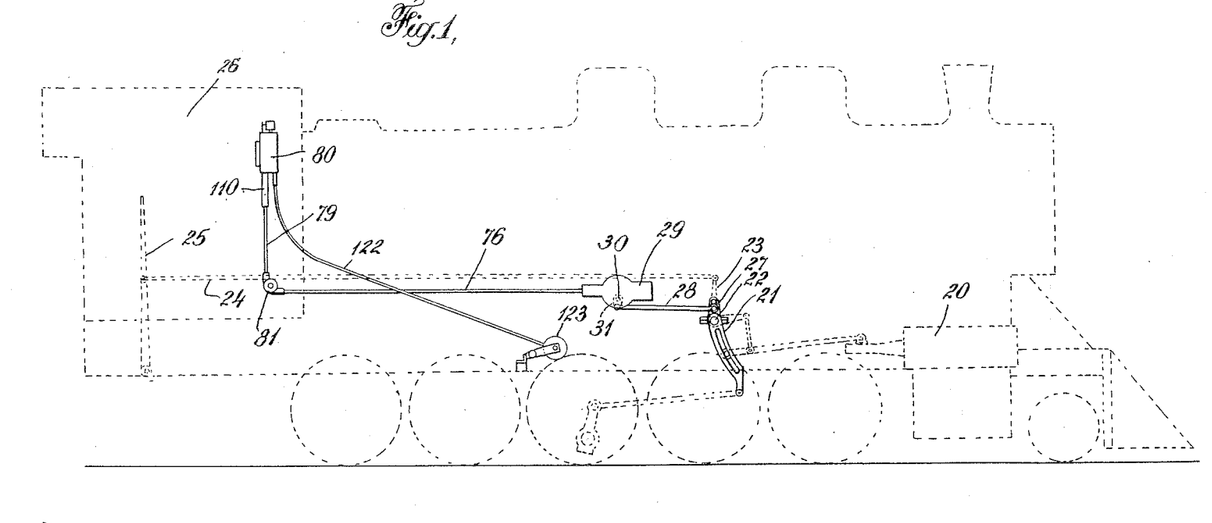
Fig. 1 is a view, largely diagrammatic, of a locomotive showing the apparatus installed thereon.

Referring now to these drawings, in Fig. 1 there is diagrammatically shown a side view of a locomotive having the cut-off valve 20 actuated by operating gear of well-known type, generally designated by the numeral 21. The tumbling shaft 22 is provided with a lever 23, to which is attached a rod 24, extending to the reverse lever 25 in the cab 26.

Fast on the tumbling shaft is an arm 27, to which is pivotally secured a rod 28. The arm is preferably arranged so that the position of the pivotal connection may be changed, as may be required. Suitably mounted on a fixed part of the locomotive structure, near the valve gear, is the housing of the conversion device 29, shown in detail in Figs. 2 to 6, inclusive. Through one wall of the housing extends a shaft 30, and fast on the outer end of the shaft is a link 31, to which one end of the rod 28 is pivotally attached.

The shaft 30 is mounted in suitable bearings in the housing and carries a gear 32 which meshes with a gear 33 fast on a shaft 34 mounted in suitable bearings in the housing above the shaft 30. With this arrangement it will be observed that when the valve gear is operated to adjust the position of the cut-off valve, the movement of the tumbling shaft will be communicated through the connections described to the shaft 34, and the latter will assume an angular position which will correspond to the position of the cut-off valve and consequently to the point of cut-off.

The shaft 30 is provided with an oil groove 35 in which is placed an oil ring 36, and the bearing 37 in which the shaft rotates is channeled as at 38 to form an oil passage. A similar oil passage 39 leads from the bottom of the channel 38 into a well 40, in the bottom of the housing, and the shaft 30 is longitudinally drilled as at 41, for the passage of oil. This longitudinal bore has outlets 42 and 43, through which the oil may be delivered from the central passage to the surface of the bearings. The channel 38 prevents the oil from flowing out along the shaft beyond the end of the bearing. The shaft 30 is also provided with an oil pipe 44, shown more clearly in Fig. 5, and as the shaft is rocked the end of this oil pipe dips beneath the surface of the oil 45 collecting in the lower part of the housing. As the shaft is moved upwardly, the oil runs through the pipe 44, into the central bore 41, and is thence delivered to the surface of the bearing.

The housing 29 is made in three parts. The main part consists of an upright plate 46, which carries a bearing 47 for the shaft 34, and another bearing 48, for the shaft 30. Beyond the bearing 48 the plate 46 joins a lower plate 49 which is turned up at the front edge, as at 50, to provide an oil well. At the rear the plate 49 carries the bearing 37. The plate 46 has an opening 51 to permit the flow of oil from the front part of the well to the rear part, in which runs the gear 32.

The front of the housing is closed by a plate 52, which extends down so as to overlie the upstanding portion 50 of the plate 49 and the rear part of the housing is closed by a plate 53 which is secured to a plate 54, extending rearwardly and formed as a part of the plate 46. The plate 53 carries a bearing for the rear end of the shaft 34.

Figure 6:
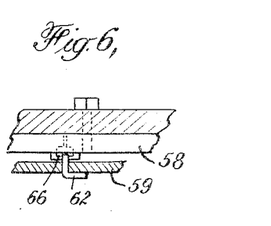
Fig. 6 is a cross-sectional view of a detail of the mechanism showing one of the lubricating devices.
Figure 7:
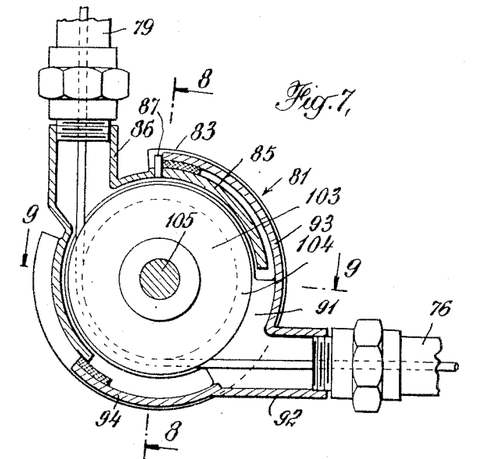
Fig. 7 is a view with parts removed, of a cable guide used in connection with the apparatus.
Figure 8:
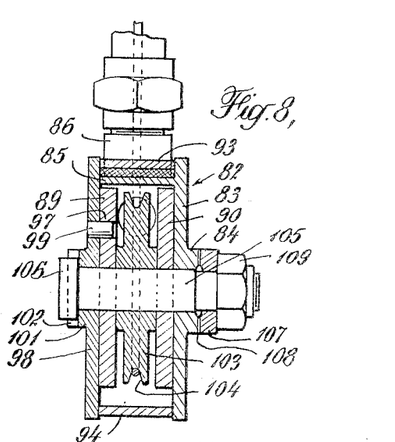
Fig. 8 is a sectional view on the line 8—8 of Fig. 7.
Figure 9:
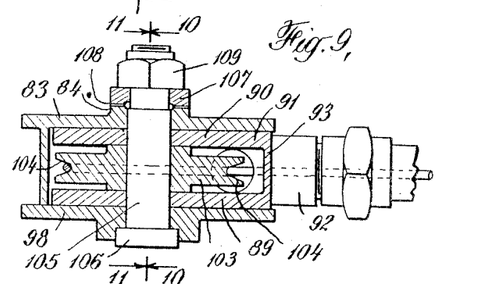
Fig. 9 is a sectional view on the line 9—9 of Fig. 7, Figs. 10 and 11 are sectional views on the lines 10—10 and 11—11, of Fig. 9, respectively.
Figure 10:
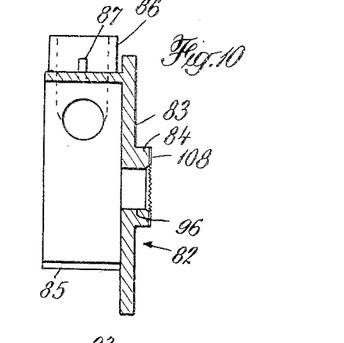
Figure 11:
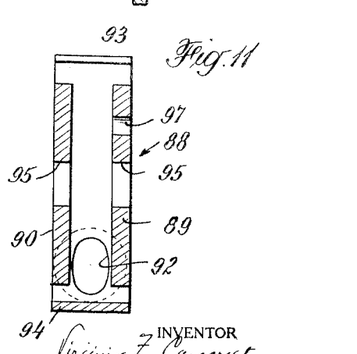
Figures 12, 13:
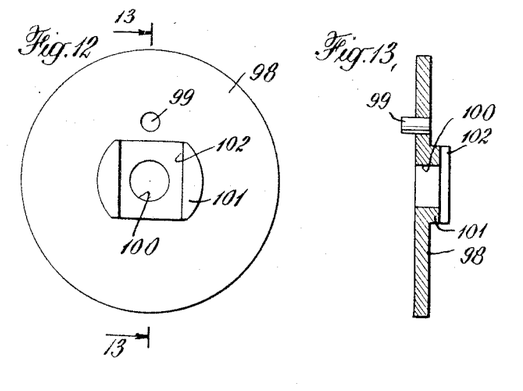
Fig. 12 is a face view of a cover plate of the casing for the guide.
Fig. 13 is a sectional view on the line 13—13 of Fig. 12.
Figure 14:
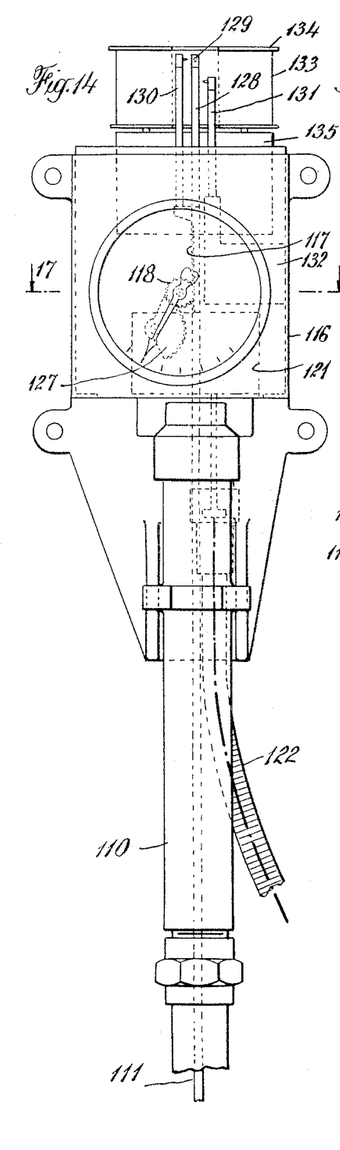
Fig. 14 is a front view of the indicating instrument.

The plate 46 is provided with a portion 55 in its front face, which forms a guide-way for a slide 56. The lower edge of the guide-way is undercut, as at 57, and in the upper edge of the guide-way is placed a gib 58, also overhanging the face of the guide-way, so that the way has a dove-tailed section. On the forward end of the shaft 34 is fixed a cam 59 on the forward face of which are secured, by a plate 60, a pair of oil pipes 61, 62. Both of these pipes have intake ends which dip within the level of the liquid in the well in the bottom of the housing, and the pipe 61 leads to a bore 63, formed in the shaft 34. This shaft has openings through which the oil may be distributed along the bearing, and is channeled at its rear end at 64, an oil ring 65 lying in this channel. The other oil pipe 62 extends through an aperture in the cam, as indicated in Fig. 6, and discharges into a well 66, formed in the face of the gib. The oil from this pipe serves to lubricate the surface of the guide-way.

As described in my copending application, previously referred to, the operation of an instrument of this type is greatly simplified when all of the factors governing the position of the cut-off valve to produce maximum draw-bar pull, are converted into a single expression in terms of units of surface speed. When the locomotive is equipped with a speed indicating instrument which indicates speed in miles per hour, then all the constant and variable factors governing cut-off for production of maximum work, should be similarly expressed in miles per hour. In that application I have described a method of converting all these factors into such units, and of producing a cam shape which may be interposed in the connections between the cut-off valve and the needle which indicates the position of the latter, so that the needle gives a reading in units of miles per hour. Under such conditions it will be apparent that for each position of the cut-off valve, the needle will indicate the speed at which that position of the valve will produce the maximum draw-bar pull. Thus, the locomotive driver may secure maximum work from the locomotive throughout its range of speed by so adjusting the valve that the needle operatively connected to it will always have a position in correspondence with the needle which indicates the speed. This is so because as the cut-off needle indicates the position of the valve for maximum work, then when this speed is the same as the actual surface speed of the locomotive, it is apparent that the cut-off valve is properly adjusted. In the copending application the method of producing the cam which is appropriate for a given locomotive having a certain wheel diameter and piston stroke has been explained, and the cam 59 in the present apparatus is a cam formed according to that method. The housing containing the cam, the means by which it is rotated, and the means presently to be described by which the movement of the cam controls the position of the cut-off indicating needle, together form what may be termed a "conversion device", by which all of the constant and variable factors governing the position of cut-off for maximum draw-bar pull are converted into terms of miles per hour, which result is expressed by means of the cut-off indicating needle.

The slide 56 which is movable in the guide-way previously referred to, carries on its front face a plate 67 which is adjustably bolted in place thereon. This plate carries a stud 68, on which is mounted a roller 69 which bears against the face of the cam 59, and an adjusting screw 70 bearing against the end of the plate 68, makes it possible to give that plate accurate adjustment with reference to the slide 56. As previously mentioned, the slide has an aperture through which the shaft 34 extends, and as the cam is moved to different positions it causes the slide 56 to move to and fro in the guideways. Secured to the face of the plate is a bar 71, to which are attached springs 72, the other ends of which are secured to fixed points of the housing. These springs cause the slide to be held resiliently in such a position that the roller 69 always bears against the face of the cam.

At the end of the slide, opposite that on which the roller is mounted, is an aperture 73, through which passes a loop of a cable. The cable enters the housing through an opening 75 and a conduit 76 communicating with the opening is secured to the housing through a union 77. The cable enters from the conduit and then passes through a suitable channel formed in a two-part clamping plate 78, the end then passing through the aperture 73 and being led back on the surface of the clamping plate to be held in position by one of the halves of the latter. The effective length of the cable may be varied at this point, and, by means of the adjusting screw 70, it is possible to produce a fine adjustment in the length of the cable, by varying the position of the slide on which the plate carrying the roller is mounted.

From the description of the parts which go to make up the conversion device, it will be seen that when the operating gear for the cut-off valve is moved to give the valve different positions of adjustment, this movement which is brought about by a movement of the tumbling shaft, will be transmitted through the lever 28 to the shaft 30. The gear 32 on this shaft, meshing with the gear 33, causes the shaft 34 to rock. This in turn causes a displacement of the cam and the slide which carries the roller bearing against the surface of the cam also takes a different position of adjustment, corresponding to the position of the cut-off valve. The movement of the slide causes the cable either to be drawn into or let out of the housing, and this movement of the cable, causes a movement of the needle, which indicates the position of cut-off. The gear 32 is so proportioned with reference to the gear 33, that when the tumbling shaft moves through its arc, which will vary from 25–27½%, in either direction from the center, the cam will be rocked through an arc of 90°. Thus the cam from the limit of its forward to the limit of its reverse movement, will describe an arc of 180°, although the tumbling shaft, during this time, moves only approximately 55°. Although the range of the tumbling shaft movement varies in valve operating gear, there are only a few standard types of gear in use, and accordingly, it is not difficult to select a pair of gears which are of appropriate size to produce the desired result. As previously described, the cam 59 is designed for a given ratio between wheel diameter and piston stroke. In the different types of locomotives in common use, there are only a few different ratios of this kind. Accordingly, cams of varying shapes appropriate to these different ratios, will be kept in stock by the railroads on which the instruments are to be used, and the cam used will depend on the type of locomotive in which the instrument is to be placed.

As shown in Fig. 1, the conversion device 29 is mounted on the locomotive in proximity to the tumbling shaft. The conduit 76 through which the cable attached to the slide passes, is carried back to the cab and a section 79 of the conduit leads upwardly to the instrument 80 in the cab in which the needle operatively connected to the cable is placed. In Fig. 1 the section 79 of the conduit is placed vertically, and the cable passes from the section 76 to the section 79, through a guide designated generally as 81. This guide has outlets placed substantially at right angles in the installation, shown in the drawings, but under certain conditions it may be necessary to have one or the other of the conduit sections lying in an inclined position. Under these conditions it would not be satisfactory to have a guide having outlets at right angles. The conditions of different installations vary to a considerable extent, and it therefore is desirable to provide a guide member so formed that it may be used, regardless of the angle formed between the two conduit sections. In Figs. 7 to 11, inclusive, I have shown a guide member which may be adjusted according to the requirements of the installation.

This guide member consists of three elements, one of which 82 consists of a plate 83, provided with a boss 84, extending out centrally from one face. On the opposite face is a flange 85 which extends part way around the plate. Formed as a part of this flange is an outlet 86. A stop pin 87 extends upwardly from the flange at a point near the outlet 86. The second housing member 88 is provided with two approximately circular portions 89 and 90, having a diameter such that they will fit within the flange 85, these members being united by a member 91 which carries an outlet 92. From either side of the member 91 extend arcuate flanges 93 and 94, which loosely fit over the flange 85. The members 89 and 90 are provided with central bores 95, which, when the parts 89 and 82 are in their assembled relation, are placed opposite the bore 96 in the boss 84. The plate 89 is also provided with an aperture 97. The housing is closed by a cover plate 98, provided with a stud 99 designed to enter the aperture 97. This cover plate has a central aperture 100, formed in the boss 101, which is also provided with a straight-sided slot 102. In assembling the parts, a guide wheel 103, provided with a circumferential groove 104, to receive the cable, is placed between the plates 89 and 90. The guide plate 98 is put in position and a pin 105, having a square head 106, is inserted through the plate 98, plates 89 and 90, and the wheel, the end of the pin extending out beyond the end of the boss 84. The square head of the pin lies in the slot 102, and a nut 107 is placed on the other end of the pin, this nut having a serrated surface which engages similar serrations 108, formed on the outer end of the boss 84. The parts are then held together by means of a nut 109, on the end of the pin.

Figure 2:
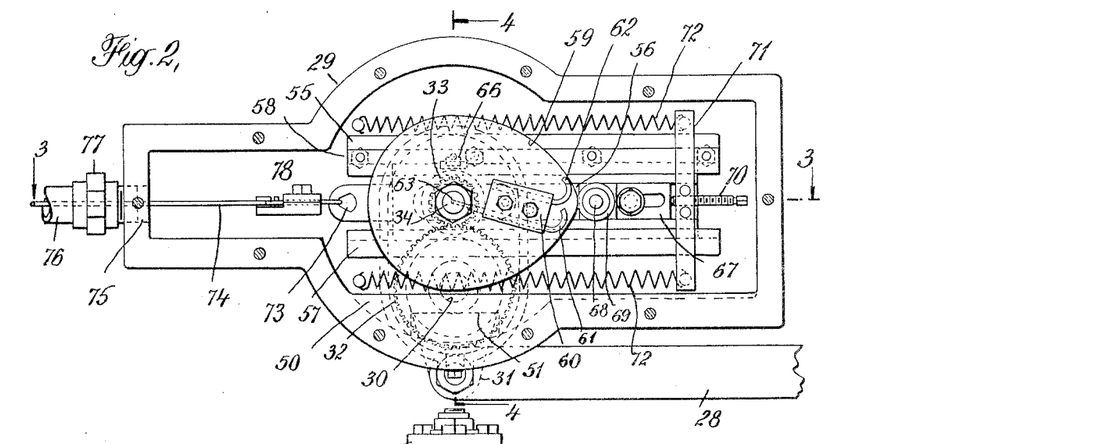
Fig. 2 is a face view of the conversion device with the cover plate removed.
Figure 3:
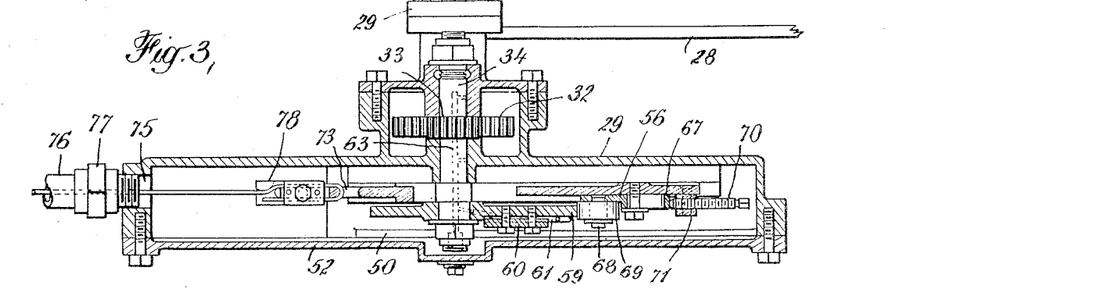
Fig. 3 is a longitudinal sectional view on the line 3—3 of Fig. 2.
Figure 4:
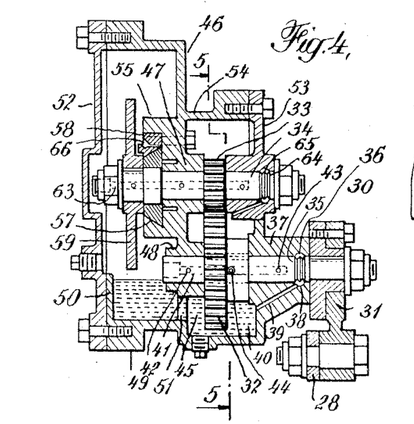
Fig. 4 is a transverse view on the line 4—4 of Fig. 2.
Figure 5:
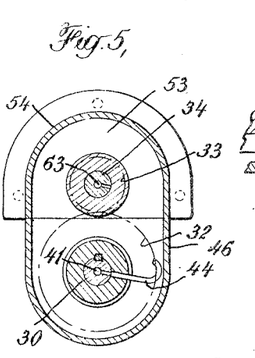
Fig. 5 is a sectional view on the line 5—5 of Fig. 4.

It will be seen from the description of the parts that the outlets are secured to separate conduit sections, and in the construction illustrated in Fig. 2, the two outlets are placed substantially at right angles. When the conditions of the installation require that the axes of the outlets should form a different angle, the nut 109 is loosened to release the adjusting nut 107 from the end of the boss 84, and the members 82 and 88 are moved angularly the required distance, and then clamped in position. It will be noted that the wheel 103 and the outlets are so placed that the cable, after leaving the wheel, lies at the axes of the outlets. Thus, when the cable is moved, the direction of movement is changed in the guide member, but the cable cannot come into contact with any part of the guide except the wheel.

Figures 15, 16, 17:
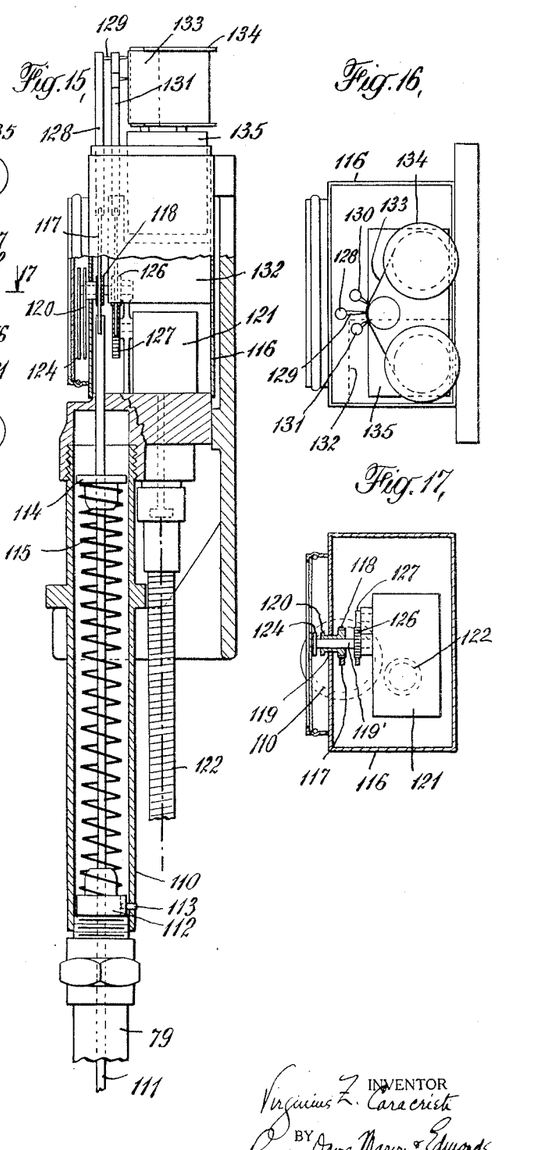
Fig. 15 is a side view of the instrument shown in Fig. 14, certain of the parts being shown in section.
Fig. 16 is a top view of the instrument.
Fig. 17 is a sectional view on the line 17—17 of Fig. 14.

From the guide member the cable passes upwardly through the conduit section 79 to the instrument which is provided with a conduit 110, secured to the upper end of the conduit section 79. Within the conduit 79, near the end thereof, the cable is connected by appropriate means to the end of a rod 111, which passes up into the conduit 110 through a sleeve 112, secured in place near the lower end of the conduit 110 by a set screw 113. A collar 114 is attached to the rod at some distance from the sleeve 112, and a spring 115 bearing at one end against the collar and at the other against the sleeve, forces the rod upwardly, as shown in Fig. 15. At its upper end the rod extends into the instrument casing 116, and is provided therein with a rack 117, the teeth of which engage a gear 118 on a sleeve 119, on a shaft 119' mounted in appropriate bearings. The sleeve carries a needle 120 in its outer end, and accordingly as the cable is moved, the needle will also be moved by means of the gear 118 and rack 117. The position of rest of the needle will therefore be determined through the operative connections in accordance with the position of adjustment of the cut-off valve.

Also mounted within the instrument casing 116 is a speed indicating device 121, which is driven from a moving part of the locomotive. In the present instance the moving parts of the instrument drive are actuated by means of a flexible shaft within a housing 122. This shaft is driven by means of a wheel 123, bearing on the tread of one of the locomotive wheels. The construction and operation of these parts may be of any well-known type, and need not be further described. The speed indicating device is provided with a needle 124, carried on the shaft 119'. This shaft has a gear 126, driven by a quadrant shaped rack 127, which is actuated by the usual governor mechanism (not shown), commonly employed in instruments of this type, or by any other suitable mechanism for the purpose.

Both needles move over a scale which is affixed to the face of the instrument and may be protected by a glass cover. The needles are preferably of different colors and may be of different lengths so that they can be readily distinguished, and both needles have the same range of movement so that a single scale is suitable for both of them. This scale is provided with scale divisions in terms of miles per hour, and when the locomotive is in operation the needle connected to the speed indicating instrument will assume different positions relative to the scale in accordance with the speed of surface travel of the locomotive while the cut-off needle will occupy a position which is determined by the position of the cut-off valve.

The instrument thus described provides means for indicating the speed of surface travel of the locomtive, and also that speed for which the position of the cut-off valve will produce the maximum work at any instant. As the speed of the locomotive varies, the speed indicating needle will indicate the instantaneous variations of speed with reference to the scale and the locomotive driver will adjust the position of the cut-off valve by the gear so as to suit the conditions of operation. Since the needle operatively connected to the cut-off valve indicates that speed for which each position of the valve will produce maximum work, the driver may operate the locomtive at the maximum efficiency by adjusting the valve so that the two needles are in co-incidence at all times. When the reverse lever is of the hand-operated type, provided with the usual quadrant, the driver may secure the best conditions of operation without being required to pay attention to the position of the lever with reference to the quadrant.

In devices which have heretofore been suggested to permit the engine driver to secure the maximum draw-bar pull by proper cut-off adjustment according to speed, I am aware that it has been proposed to use a needle operated from the speed indicating mechanism and mounted on the reverse lever quardrant. This needle is intended to indicate the position with reference to the quadrant at which the lever should be placed to secure the best results as the speed varies. In such a device the engineer must watch the quadrant needle during the operation of the locomotive, and as the quadrant is usually in an out of the way place in the cab, it is difficult to do so. I am also aware that it has been proposed to mount a second scale on a speed indicating instrument, this scale being provided with indicia corresponding to the notches of the quadrant in which the reverse lever may be placed. A similar scale is then placed on the quadrant, and when the speed needle indicates that the cut-off should take place at a certain point in the stroke this point may be determined by reference to the scale on the speed indicating instrument, and the engineer, by consulting the scale on the quadrant may then place the lever in the proper position. This instrument involves watching the speed indicating instrument and also watching the scale on the quadrant in moving the reverse lever. The present instrument, however, differs from both of these proposed constructions in that the second needle on the speed indicating instrument is operatively connected to the cut-off valve and the factors which govern cut-off to produce maximum draw-bar pull are all converted by the conversion device, into units of surface speed. Consequently the engineer may operate the locomotive to produce maximum work simply by making sure that the cut-off needle is always in correspondence with the speed needle, and this operation may be readily carried on since both needles are in the same instrument, or at least in proximity to each other.

The instrument so far described merely indicates the instantaneous variations of surface speed and simultaneously indicates the speed at which each position of the cut-off valve will produce the maximum drawbar pull. If desired, a continuous record of both values may also be made, and for this purpose the rack member 117 is provided with a rod 128, which projects through the top of the instrument casing and carries a pencil 129. A similar rod 130, carrying a pencil, may also be operatively connected with the speed indicating needle, these rods being moved up and down vertically as the needles associated with them move over the scale. In a similar way, a third rod, 131, with a pencil may be driven by a suitable clock mechanism 132, the details of which are not shown, mounted in the main instrument housing. Above the housing is a record surface which may take the form of a tape 133, carried on spools 134, driven by mechanism contained within a housing 135. The details of this driving mechanism are well-known and need not be further described. The pencils carried by each of the three rods bear against the record surface and during the movements of the locomotive, a continuous record of time, speed, and position of cut-off are recorded on the single tape. The record so provided will show whether the locomotive has been operated at the maximum efficiency throughout the run, also the rates of speeds at the different parts of the run, and the length of time through which the different rates of speed are maintained.

It will be seen that the present invention provides a convenient and satisfactory apparatus which permits locomotive operation to be carried on at maximum efficiency at all times. Since the driver has only to refer to the speed indicating instrument to find out the proper position of adjustment of the cut-off valve, this adjustment may be made accurately without difficulty. In the apparatus which has previously been proposed for the purpose, it is extremely difficult for the driver to make accurate adjustments of the valve and consequently there is greater chance that a careless driver will disregard the instrument and operate the locomotive without regard to efficiency. The present instrument, by providing means for making a continuous record of operation by which the actions of the driver may be checked, also induces him to adjust the valve according to the best conditions as indicated.

The apparatus has been described in the form appropriate for locomotive operation, but it can also be used with stationary engines with facility. For this purpose the speed indicating instrument would give an indication in revolutions per minute, for example, and the drive shaft and the cam interposed in the connections between the cut-off valve and the cut-off needle will be designed to convert all the factors governing cut-off into terms of revolutions per minute of the drive shaft. The method for designing this cam to meet these conditions has been explained in my co-pending application previously mentioned. With such a cam in place, the operation of the stationary engine may also be carried on under conditions producing maximum cylinder result.

I claim:

1. The combination with the operating gear for the cut-off valve of a locomotive, of means for indicating the surface speed of the locomotive, and means actuated by the said operating gear and indicating in the same units as those in which the surface speed is indicated, those speeds at which the different positions of the cut-off valve will produce the maximum draw-bar pull.

2. The combination with the operating gear for the cut-off valve of a locomotive, of means for indicating the surface speed of the locomotive, and means operatively connected with the cut-off valve, and indicating, in the same units as those in which the surface speed is indicated, those speeds at which the different positions of the cut-off valve will produce the maximum draw-bar pull.

3. The combination with the operating gear for the cut-off valve of a locomotive, of means for indicating the instantaneous values of the surface speed of the locomotive, and means operatively connected with the cut-off valve and movable to different positions as the latter moves, for indicating, in the same units as those in which the surface speed is indicated, the speeds at which the different positions of the cut-off valve will produce maximum draw-bar pull.

4. The combination with the operating gear for the cut-off valve of a locomotive, of means for indicating the surface speed of the locomotive, the said means including a moving needle, and means operatively connected with the cut-off valve and indicating in the same units as those in which the surface speed is indicated, the speeds at which the different positions of the cut-off valve will produce maximum draw-bar pull, the said means including a needle movable to different positions corresponding to the different settings of the cut-off valve.

5. The combination with the operating gear for the cut-off valve of a locomotive, of means for indicating the surface speed of the locomotive, the said means including a needle movable to different positions throughout the range of speed of the locomotive, and means operatively connected with the cut-off valve and indicating in the same units as those in which the surface speed is indicated, the speeds at which different positions of the cut-off valve will produce maximum draw-bar pull, this means including a needle in proximity to the needle first mentioned, and movable, by the adjustment of the cut-off valve, through a path of travel similar to that through which the speed indicating needle moves.

6. The combination with the operating gear for the cut-off valve of a locomotive, of means for indicating the surface speed of the locomotive, the said means including a needle moving over a scale and assuming different positions of rest according to the speed of the locomotive, and means operatively connected with the cut-off valve and indicating, in the same units as those in which the surface speed is indicated, the speeds at which different positions of the cut-off valve will produce maximum draw-bar pull, this means including a needle movable over the said scale in proximity to the first needle.

7. The combination with the operating gear for the cut-off valve of a locomotive, of means for indicating the surface speed of the locomotive, the said means including a needle moving over a scale and assuming different positions of rest according to the speed of the locomotive, and means operatively connected with the cut-off valve and indicating in the same units as those in which the surface speed is indicated, the speeds at which different positions of the cut-off valve will produce maximum draw-bar pull, this means including a needle associated with the first needle and movable by the adjustment of the cut-off valve through a path identical with that through which the speed-indicating needle moves.

8. The combination with the operating gear for the cut-off valve of a locomotive, of means for indicating the surface speed of the locomotive, and means actuated by the operating gear for indicating the speeds at which the different positions of the cut-off valve will produce the maximum draw-bar pull, the said means including a conversion device by which the factors governing cut-off to produce maximum draw-bar pull are converted into a single expression in the same units as those in which the surface speed is indicated.

9. The combination with the operating gear for the cut-off valve of a locomotive, of means for indicating the surface speed of the locomotive, and means operatively connected with the cut-off valve for indicating the speeds at which the different positions of the cut-off valve will produce the maximum draw-bar pull, this means including a conversion device in the connections, for converting the constant and variable factors governing the adjustment of the valve to produce the maximum draw-bar pull into a single expression in terms of the same units as those in which the surface speed is indicated.

10. The combination with the operating gear for the cut-off valve of a locomotive, of means for indicating the surface speed of the locomotive, this means including a needle movable to different positions throughout the range of speed of the locomotive, a second needle in proximity to the first, operative connections between the needle and the cutoff valve, and a conversion device interposed in the connections for converting all the factors governing the position of the valve to produce maximum draw-bar pull, into a single expression in terms of those units in which the surface speed is indicated, whereby the position of the second needle will indicate the speeds at which the different positions of the cut off valve will produce maximum draw-bar pull.

11. The combination with the operating gear for the cut-off valve of a locomotive, of means for indicating the surface speed of the locomotive, this means including a needle movable to different positions throughout the range of speed of the locomotive, a second needle in proximity to the first and movable throughout a similar range, operative connections between the second needle and the cut-off valve, and a conversion device interposed in the connections and operable to convert the factors governing cut-off to produce maximum draw-bar pull, into a single expression in terms of those units in which the speed is indicated, the conversion device serving to control the action of the second needle, whereby the latter will indicate the speeds at which the different positions of the cut-off valve will produce maximum draw-bar pull.

12. The combination with the operating gear for the cut-off valve of a locomotive, of a speed-indicating device driven from a moving part of the locomotive, and including a needle movable to different positions to indicate the surface speed of the locomotive, a second needle in proximity to the first, operative connections between this needle and the cut-off valve acting to cause a movement of the needle as the valve is moved to different positions of adjustment, and a conversion device interposed in the connections and acting to convert the factors governing cut-off to produce maximum draw-bar pull, into a single expression in units the same as those in which the surface speed is indicated, this conversion device controlling the action of the second needle, whereby the latter will indicate the speed at which each position of the cut-off valve will produce the maximum draw-bar pull.

13. The combination with the operating gear for the cut-off valve of a locomotive, of a speed-indicating device driven from a moving part of the locomotive, and including a needle movable to different positions to indicate the surface speed of the locomotive, a second needle in proximity to the first and movable through a similar range of movement, operative connections between the second needle and the cut-off valve to cause the needle to assume different positions as the cut-off valve is moved, and a cam interposed in these connections and designed to convert all the factors governing the position of cut-off to produce maximum draw-bar pull, into a single expression in units the same as those in which the surface speed is indicated, this cam controlling the movement of the second needle, whereby the latter, for each position of the cut-off valve, will indicate the speed at which that adjustment will produce maximum draw-bar pull.

14. The combination with the operating gear for the cut-off valve of a locomotive, which gear includes a tumbling shaft, of means for indicating the surface speed of the locomotive, and including a moving needle, a second needle in proximity to the first, operative connections between the second needle and the tumbling shaft, and a conversion device in these connections controlling the action of the second needle, this device serving to convert all the factors governing the position of cut-off to produce maximum draw-bar pull into a single expression in units the same as those in which the surface speed is indicated, whereby, at each adjustment of the cut-off valve, the second needle will assume a position indicating the speed at which that position of the valve will produce the maximum draw-bar pull.

15. The combination with the operating gear for the cut-off valve of a locomotive, this gear including a tumbling shaft, of means for indicating the surface speed of the locomotive, said means including a needle moving as the speed varies, a second needle in proximity to the first and movable through a similar range of movement, a connection between this needle and the tumbling shaft, whereby the needle will move to different positions corresponding to the position of adjustment of the cut-off valve, and a cam in these connections for controlling the movement of the second needle, this cam being arranged to convert all the constant and variable factors governing the position of cut-off for producing maximum draw-bar pull, into a single expression in units the same as those in which the speed is indicated, whereby the second needle will indicate for each position of the cut-off valve, the speed at which that cut-off will produce the maximum draw-bar pull.

16. The combination with the operating gear for a cut-off valve of a locomotive, this gear including a tumbling shaft, of a speed indicating device including a needle driven from a moving part of the locomotive and operable to indicate the surface speed of the latter, a second needle within the device, a connection between the second needle and the tumbling shaft, and a conversion device in these connections for converting all the factors governing the position of cut-off to produce maximum draw-bar pull into a single expression in units the same as those in which the surface speed is indicated, this conversion device controlling the movements of the second needle, whereby the latter will indicate for each position of the cut-off valve the speed at which that position will produce the maximum draw-bar pull.

17. The combination with the operating gear for the cut-off of a reciprocating steam engine, of a member movable over a scale graduated to represent units of speed, means actuated by a moving part of the engine for moving the member to different positions of rest according to variations in speed, a second member movable over the scale, and means operatively connected with the cut-off valve for moving the second member to different positions of rest with reference to the scale as the cut-off valve is moved to different positions of adjustment, these positions of the second member corresponding to the speeds at which the settings of the cut-off valve will produce maximum cylinder result.

18. The combination with the operating gear for the cut-off of a reciprocating steam engine, of means for indicating the speed of the engine and means actuated by the said operating gear and indicating in the same units as those in which the speed is indicated those speeds at which the different positions of the cut-off valve will produce maximum cylinder result.

19. The combinating with the operating gear for the cut-off of a reciprocating steam engine, of means for indicating the speed of the engine, and means actuated by the said operating gear for indicating the speeds at which the different positions of the cut-off valve will produce maximum cylinder result, the said means including a conversion device by which the constant and variable factors governing cut-off to produce maximum cylinder result are converted into a single expression in the same units as those in which the speed of the engine is expressed.

20. The combination with the operating gear for the cut-off valve of a reciprocating engine, of a member movable through a definite range, means actuated by a moving part of the engine for moving the member to different positions of rest according to variations in speed of the engine, a second member movable through a range similar to that traversed by the first, and means operatively connected with the cut-off valve for moving the second member to different positions of rest within its range as the cut-off valve is moved to different positions of adjustment, the operating means for the second member being so constructed that the positions assumed by the second member within its range correspond to the speeds at which the settings of the cut-off valve will produce maximum cylinder result, whereby the cut-off may be adjusted to secure maximum cylinder result at any speed by adjusting the valve so that the member connected with it assumes the same position within its range that is assumed by the first member within its range.

21. The combination with the operating gear for the cut-off of a reciprocating engine, of a member pivotally mounted and movable through a definite range, means actuated by a moving part of the engine for moving the member to different positions of rest within its range according to variations in speed of the engine, a second member mounted on the same pivot as the first and movable through the same range, and means operatively connected with the cut-off valve for moving the second member to different positions of rest as the cut-off valve is moved to different positions of adjustment, these positions of the second member corresponding to the speeds at which the settings of the cut-off valve will produce maximum cylinder result.

22. The combination with the operating gear for the cut-off valve of a locomotive, of a movable needle, a cam operatively connected with the cut-off valve, and movable to different positions in correspondence with the adjustment of the cut-off valve, a member in engagement with the cam and movable to different positions by the latter, and operative connections between this member and the needle to cause the needle to move as the member is moved, the cam having such a shape as to convert all the factors governing cut-off to produce maximum draw-bar pull into a single expression in terms of units of surface speed, whereby the needle will indicate by its position the speed for which each position of the cut-off valve will produce maximum draw-bar pull.

23. The combination with the operating gear for the cut-off valve of a locomotive, of means for indicating the surface speed of the locomotive, including a needle movable over a scale, a second needle associated with the first and movable over the same scale, operative connections between the second needle and the cut-off valve, a conversion device interposed in these connections and operable to convert all the factors governing the position of cut-off to produce a maximum draw-bar pull into a single expression, the said conversion device controlling the action of the needle, whereby the latter indicates the speed at which each position of the cut-off valve will produce the maximum draw-bar pull.

24. The combination with the cut-off valve of a locomotive and gear for adjusting the position of the valve, of means for indicating the surface speed of the locomotive and including a needle movable over a scale, a second needle associated with the first and movable over the same scale, operative connections between the second needle and the cut-off valve, a conversion device interposed in the connections and operable to cause the needle to indicate in units the same as those in which the surface speed is indicated, the speeds at which the different positions of the cut-off valve will produce the maximum draw-bar pull, and manually controlled means for adjusting the position of the cut-off valve.

25. The combination with a cut-off valve and operating gear therefor, including a tumbling shaft, of a cam operatively connected with the tumbling shaft and movable to different positions corresponding to those of the cut-off valve, a member in engagement with the cam and movable to different positions determined by the cam, means for indicating the surface speed of the locomotive including a moving needle, a second needle associated with the first, and a flexible connection between the second needle and the member, the cam being so formed as to cause the second needle to give an indication in units the same as those in which the surface speed is indicated, of the speeds at which the different positions of the cut-off valve will produce the maximum draw-bar pull.

26. The combination with the cut-off valve of a locomotive and operating gear therefor, of means for indicating in units of surface speed the speeds at which the different positions of the cut-off valve will produce maximum draw-bar pull, this means including a movable needle operatively connected with the cut-off valve, and a conversion device in the connections for converting all of the factors controlling the position of cut-off for maximum draw-bar pull, into a single expression in units of surface speed.

27. The combination with the cut-off valve of a locomotive and operating gear therefor, of a device for indicating the surface speed of the locomotive, this means including a moving needle actuated from a moving part of the locomotive, a second needle associated with the first and movable through the same range of movement, means in device for moving the second needle, a cam operatively connected with the cut-off valve and designed to convert all the factors governing the position of cut-off to produce maximum draw-bar pull into a single expression in units of surface speed, a member in operative engagement with the cam and moved to different positions by the latter, a conduit between the cam and the device, a cable in the conduit connected at one end to the member and at the other to moving means, and a casing in the conduit containing a guide for changing the direction of movement of the cable.

28. The combination with the cut-off valve of a locomotive of a cam operatively connected with the valve and movable to different angular positions as the position of the cut-off valve is changed, this cam having a shape designed to convert all of the factors governing the position of cut-off to produce maximum draw-bar pull into a single expression in terms of units of surface speed, a member in operative engagement with the cam and moved to different rectilinear positions by the latter, an oscillating needle, an element in engagement with the needle and movable rectilinearly for producing an angular movement of the needle, a conduit extending between the element and the member, a cable within the conduit connected to the element and to the member, and a casing in the conduit containing a guide for changing the direction of movement of the cable.

29. In a device of the class described, the combination with a locomotive cut-off valve and operating the gear therefor, of a housing, a cam within the housing operatively connected to the valve and movable to different angular positions as the valve is moved, a member in the housing in engagement with the cam and movable rectilinearly by the angular movements of the cam, a movable needle disposed at a point remote from the casing, an element in engagement with the needle and movable rectilinearly to actuate the needle, a cable connected to the element and to the member in the housing, a conduit through which the cable extends, and a casing forming part of the conduit and containing a guide over which the cable passes to change the direction of movement of the latter.

30. In apparatus of the class described, the combination of a moving needle, a slide connected therewith, and means connected with the tumbling shaft of a locomotive for actuating this slide, the said means including a cam designed to convert all the factors governing the production of cutoff to produce maximum draw-bar pull into a single expression in terms of units of surface speed.

31. In apparatus of the class described, the combination of a needle, a slide operatively connected with the cut-off valve of a locomotive and assuming different retilinear positions in accordance with the adjustment of the latter, a connection between the slide and the needle operable to cause the latter to assume different positions corresponding to those of the slide, and means interposed between the slide and the cut-off valve for converting all of the factors governing the position of cut-off to produce maximum draw-bar pull to a single expression in terms of units of surface speed, whereby the position of the needle will indicate the speed at which that position of the cut-off valve will produce the maximum work.

32. In apparatus of the class described, the combination of a slide operatively connected to the cut-off valve of a locomotive and movable to different positions as the latter is adjusted, a cam interposed in these connections and operable to convert all the factors governing the position of cut-off to produce maximum draw-bar pull into an expression in units of surface speed, and a needle positioned remotely from the slide and operatively connected therewith, this needle assuming different positions of adjustment corresponding to those of the slide.

33. The combination with a tumbling shaft operatively connected with the cut-off valve of a locomotive, of a cam connected to the tumbling shaft and moved through an angle of 180° as the valve is adjusted from its extreme forward to its extreme rear position, this cam being so designed as to convert all the factors governing the position of cut-off to produce maximum draw bar pull into an expression in units of surface speed, a slide engaging with the cam and movable by the latter to different positions of adjustment corresponding to the positions of adjustment of the cut-off valve, and a needle operatively connected with the slide and moved by the latter.

In testimony whereof I affix my signature.

VIRGINIUS Z. CARACRISTI.